United States Patent
Jordan et al.

[15] 3,660,769
[45] May 2, 1972

[54] MEANS FOR INTEGRATING A TIME LIMITED SIGNAL HAVING BASE LINE DRAFT

[72] Inventors: William E. Jordan, Foxboro; William E. Earle, North Easton, both of Mass.

[73] Assignee: The Foxboro Company, Foxboro, Mass.

[22] Filed: June 2, 1969

[21] Appl. No.: 829,681

[52] U.S. Cl. .................................... 328/127, 328/163
[51] Int. Cl. ........................................ G06g 7/18
[58] Field of Search ............ 307/229, 230; 328/127, 162, 328/163, 173; 235/183

[56] References Cited

UNITED STATES PATENTS

| 3,137,790 | 6/1964 | Berry | 328/127 X |
| 3,187,267 | 6/1965 | Merington | 307/230 X |
| 3,353,033 | 11/1967 | Gilbert | 307/230 X |
| 3,434,062 | 3/1969 | Cox | 328/127 X |

*Primary Examiner*—John S. Heyman
*Assistant Examiner*—B. P. Davis
*Attorney*—Robertson, Bryan, Parmelee & Johnson

[57] ABSTRACT

An apparatus for integrating a time limited signal is described. The signal is applied to an integrator for a predetermined time period. A measurement of the input signal base line is made before and after integration, and a voltage proportional to the difference is applied to the integrator for a second time period, proportional to the first time period.

15 Claims, 12 Drawing Figures

INVENTORS.
William E. Jordan
BY William E. Earle

Robertson, Bryan, Parmelee & Johnson
ATTORNEYS.

3,660,769

MEANS FOR INTEGRATING A TIME LIMITED SIGNAL HAVING BASE LINE DRAFT

This invention relates to integrators. More specifically, it relates to an analog electronic integrator and technique for providing automatic correction of base line drift during the period of integration.

It is often desirable to integrate a signal which may be offset from ground and subject to slow base line drifts. Simple integration of such signal without regard for base line conditions can lead to considerable error in the final measurement.

The art of chromatography is one example of a technology where the integration of a signal must be carried out with high accuracy. In a chromatography apparatus such as described in copending patent application entitled "Improved Chromatography Apparatus and Method," Ser. No. 829,682 filed on even date with this application by Raymond Annino, et al., and assigned to the same assignee, components of a mixture are detected at the output of a column containing a substance for separating the mixture components. The detector produces signal peaks each representing one component eluting from the column. The area under the peaks as measured by their integration provides an indication of the concentration of the component in the mixture. When the peak to be analyzed is very small, base line variations will seriously affect the integration results, in some cases introducing unacceptable errors.

In a preferred embodiment of the invention to be described hereinbelow in detail there is provided an integrator which automatically compensates for changing base line conditions of a signal during integration thereof. The integrator employs a memory circuit to store the base line values before and after the integration. After integration, a signal corresponding to the difference in the base line values is used to correct the integrated signal.

Accordingly, it is an object of the invention to provide a method and apparatus for accurately integrating time limited signals.

It is a further object of this invention to provide an integrator which automatically corrects for signal base line drifts.

Other objects, aspects and advantages of the invention will be understood from the following description of a preferred embodiment of the invention considered together with the drawings wherein:

FIG. 1A is a timing diagram for pulses generated by a network in FIG. 1;

Figure 1:
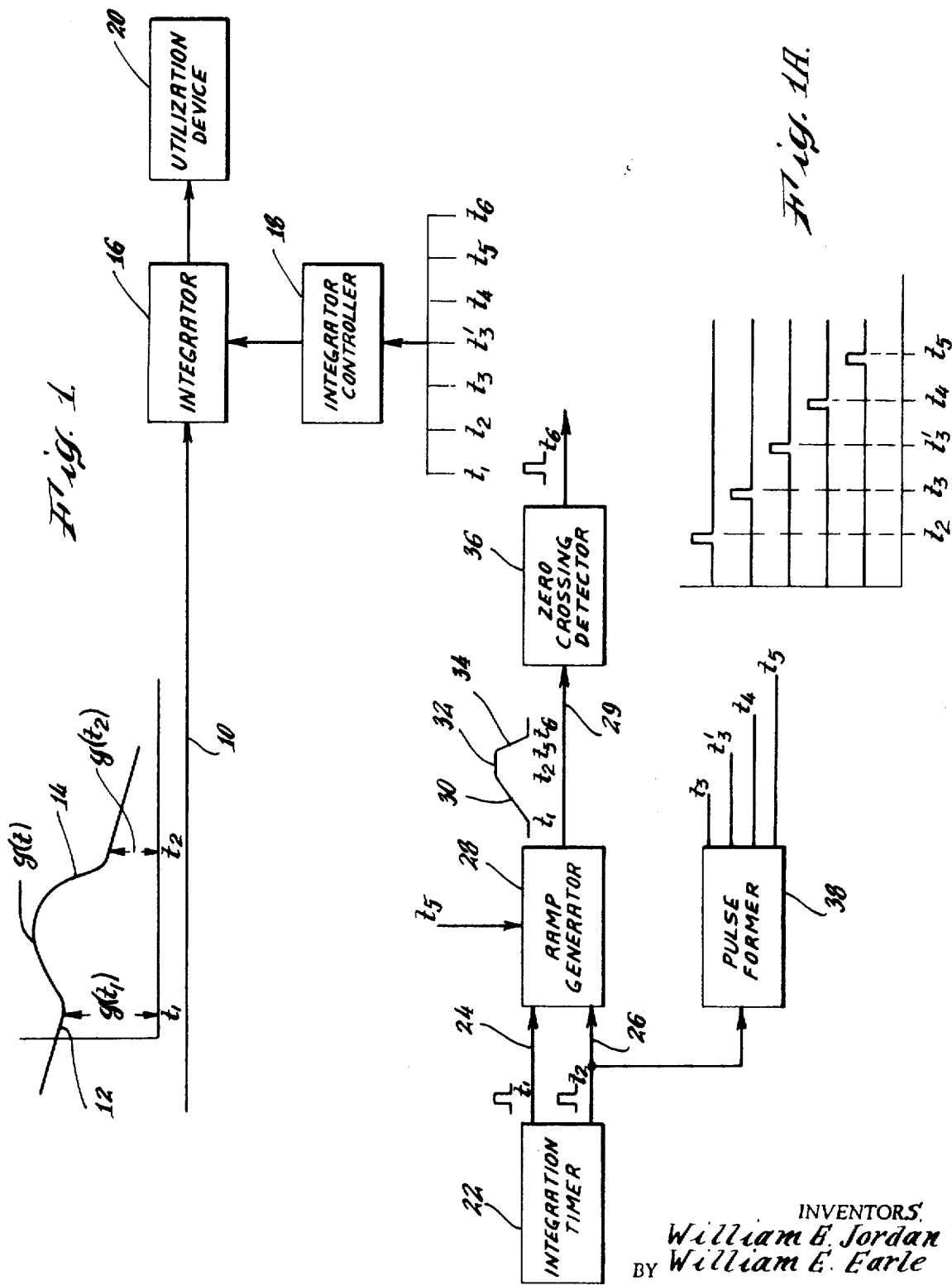
FIG. 1 is a schematic diagram of an integrator apparatus in accordance with the invention.

With reference to FIG. 1, an input line 10 carries a signal $g(t)$ such as is obtained from a detector used with a chromatography apparatus as described in the above-identified copending application. The signal waveform is partially shown with a base line 12 and a peak 14. The base line 12 follows a gradual downward drift which may be the result of "tailing" of a preceding peak, or environmental effects such as temperature or equipment instability.

The signal input line 10 is connected to an integrator 16 and is operated under control of an integrator controller 18. The output of the integrator is coupled to a utilization device 20 such as a strip chart recorder to display the results of the integration of the peak 14. An integration timer 22 generates timing signals at times $t_1$ and $t_2$ indicative of the time period when the input signal $g(t)$ is to be integrated.

The function of timer 22 is simply to identify the beginning and end of the signal peak 14. At time $t_1$ the voltage on input line 10 is still representative of the base line 12 and likewise at time $t_2$ the voltage on input line 10 is again representative of the base line 12. The integration timer 22 produces pulses at times $t_1$ and $t_2$ which are issued on separate output lines 24 and 26 respectively. The means for producing such pulses forms no part of this invention and therefore will not be described in detail herein.

The pulses $t_1$ and $t_2$ are coupled to timing controller 18 which serves to start the integrator at $t_1$ and stop it at $t_2$. These pulses also are directed to a ramp generator 28 which ramps up as indicated by waveform 30 during the period of integration, and for a short time thereafter stores a voltage 32 proportional to the integration time period $t_1 - t_2$. Thereafter, this voltage stored in the ramp generator is used to establish a second integration time period during which a second integration is carried out to correct the original integration for base line drift. To establish this second period, the generator 28 at time $t_5$ ramps downwardly along voltage wave 34 having a slope proportionately related to the slope of the initial up ramp. Thus when the ramp voltage reaches zero, a second time period will have been established which is proportional to the original integration period. A zero crossing network 36, of conventional design, detects the zero crossing of the down ramp 34 and issues a pulse at a time $t_6$ identifying the termination of the base line correction period $t_5 - t_6$.

The $t_2$ pulse is also coupled to a pulse former 38 to generate several timing pulses $t_3$, $t_3'$, $t_4$ and $t_5$ in the order shown in timing diagram of FIG. 1A. The pulse former 38 uses conventional single-shot multivibrators and delay networks to produce these pulses for functions as will be explained in relation with the operation of the controller 18 and integrator 16. As illustrated in FIG. 1, the controller 18 employs timing signals $t_1$ through $t_6$ for control of the integrator 16.

Figure 3:
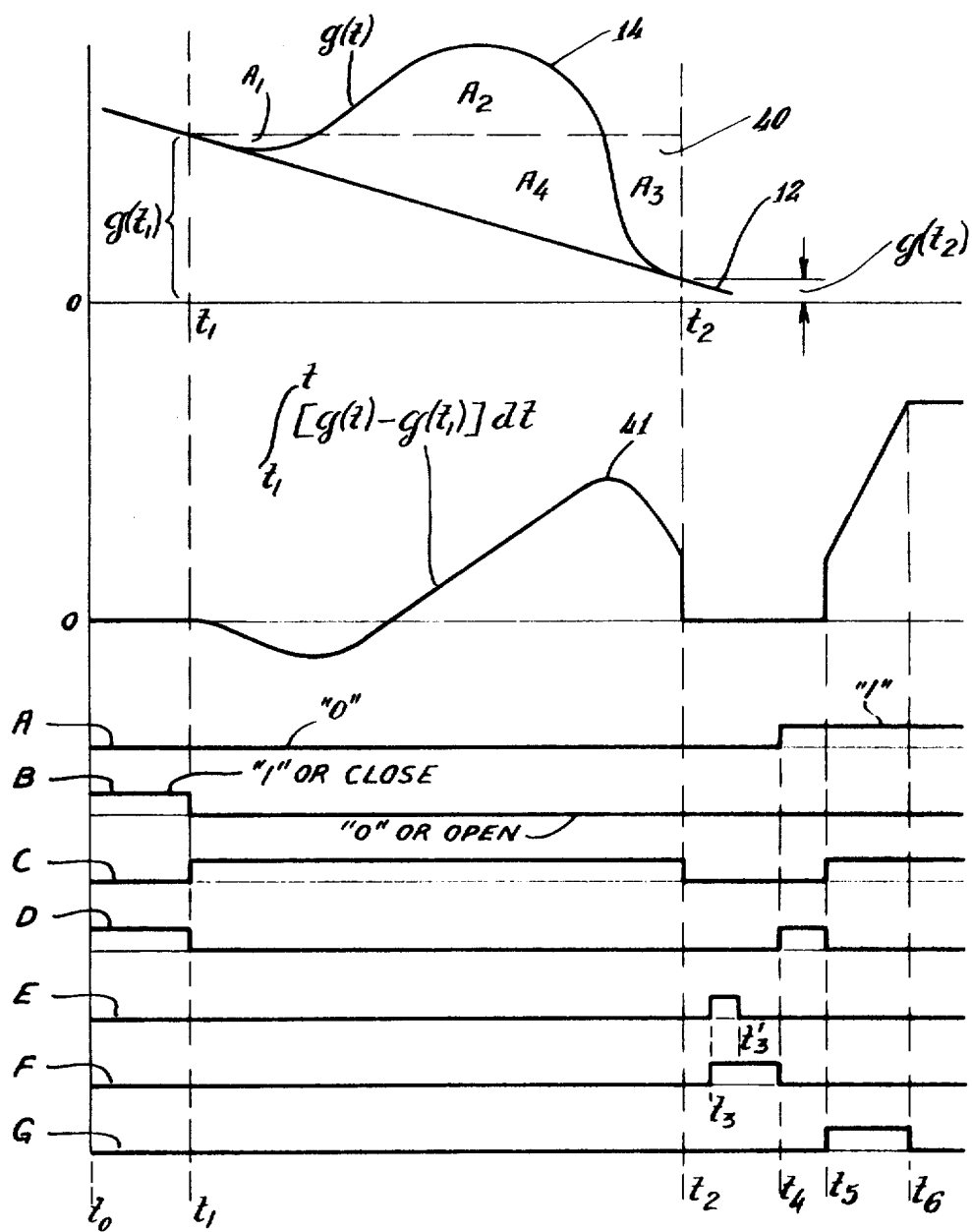
FIG. 3 is a waveform diagram illustrating operating waveforms of voltages at different points of the diagram of FIG. 1.

The integration of the peak 14 proceeds as may be best understood with reference to the waveform $g(t)$ in FIG. 3 which shows the peak 14 on an enlarged scale. In general, the procedure is as follows: At a time $t_1$ at the beginning of peak 14, the function $g(t)$ is sampled and the voltage $g(t_1)$ of the base line 12 is stored. Thereafter, integration proceeds on a signal which is the difference between $g(t)$ and $g(t_1)$. The area thus integrated equals $(-A_1 + A_2 - A_3)$. At the end of the integration, at time $t_2$, the base line 12 is sampled again and the difference between the base line voltage at times $t_1$ and $t_2$ is stored. Thereafter, the area within the triangle 40 formed by areas $A_1 + A_4 + A_3$ is determined by integrating the stored difference signal and dividing the result by two. The triangle area is effectively combined with the previously integrated function to yield the net area of the peak 14, $A_2 + A_4$.

Figure 2:
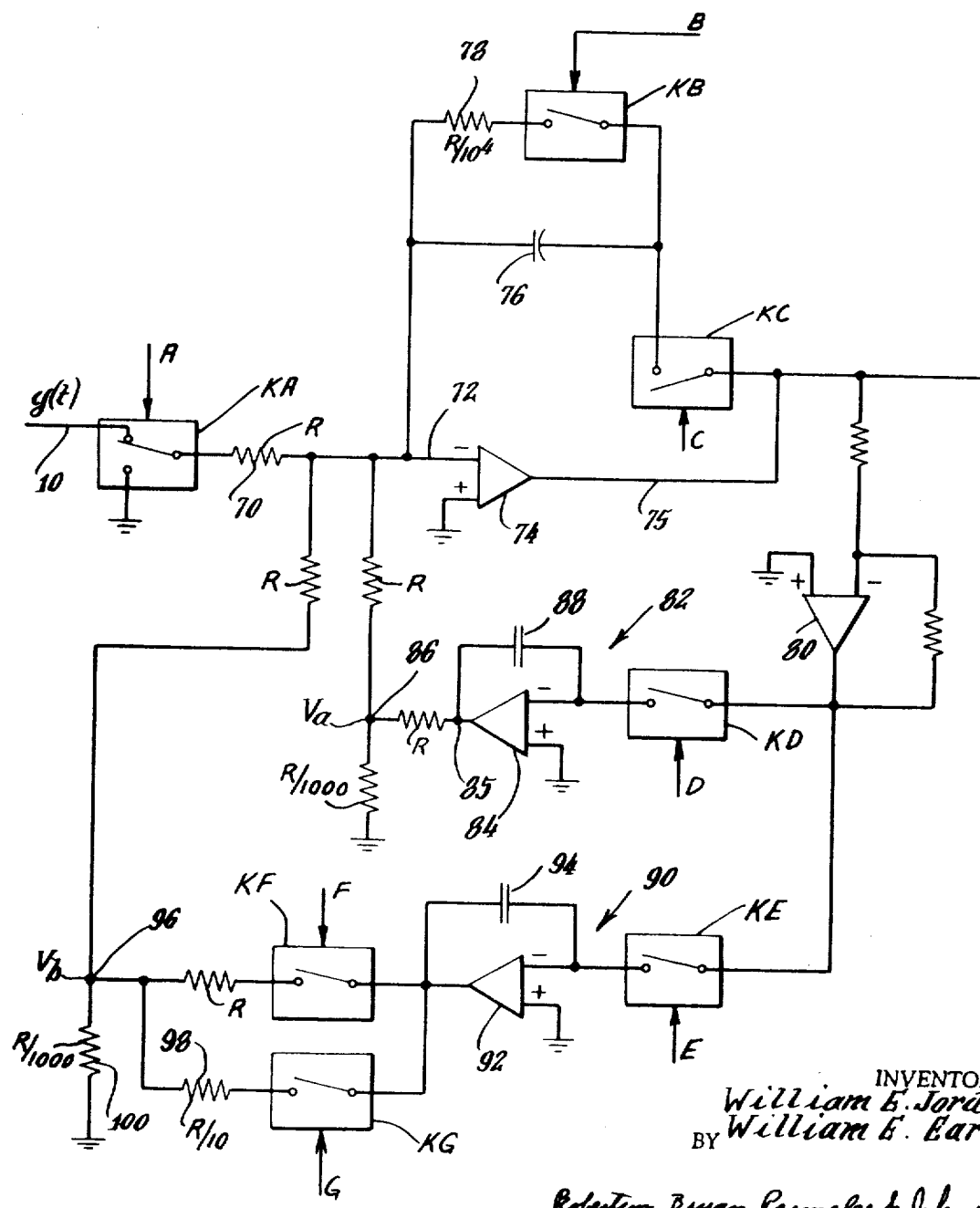
FIG. 2 is a detailed schematic diagram of portions of the integrator of FIG. 1.

FIG. 2 illustrates details of the integrator 16. The signal $g(t)$ on input line 10 is coupled through a switch KA and resistor 70 (100K) to the negative input 72 of an operational amplifier 74 having its positive input grounded. This amplifier includes a feedback capacitor 76 which, in conjunction with input resistor 70 provides linear integration action. Prior to integration, capacitor 76 is connected to a resistor 78 to discharge the capacitor.

The operation of the integrator 16 is dependent upon the setting of the several switches. The following description of its operation refers to control signals A, B, C, D, E, F, and G which respectively control the state of switches KA, KB, KC, KD, KE, KF and KG. In the diagrammatic presentation of these signals, a "0" indicates that the switch is in its normal state as drawn in FIG. 2 and "1" indicates the switch is energized and placed in its alternate position. The control signals for the switches are generated as shown in FIG. 4. The switches may be conventional electronic gates. The timing relationships of the control signals A through G may be observed from FIG. 3 where a positive level represents "1" and zero level represents "0."

Prior to integration, the switches are in the condition:

```
A B C D E F G
0 1 0 1 0 0 0
```

During this condition, the voltage on input 10 is applied to amplifier 74. Its output is inverted by amplifier 80 and directed through a feedback loop 82 including a third amplifier 84. The net voltage at the input to amplifier 74 is maintained at zero by negative feedback action, so that the voltage at junction 86 will be equal to $-g(t)$. A voltage divider may be used in the output circuit of amplifier 84, e.g. to provide a ratio of 1,000:1, in which event the voltage at the amplifier output 85 actually will be $-1,000 \times g(t)$. This voltage is maintained in a memory capacitor 88 connected around amplifier 84. It may be noted that this feedback action prior to integration effectively zeroizes the integrator, i.e. it stores a signal value representing not only base line drift level, but also including a component responsive to any amplifier offset voltage.

At time $t_1$ switch KD is opened and the signal at the output of amplifier 84 is $-1,000 \times g(t_1)$. This value is stored in capacitor 88 since there are no current paths available to discharge capacitor 88. Thus, $V_a = -g(t_1)$.

KC is now closed and KB is opened so that the control signals are:

| A | B | C | D | E | F | G |
|---|---|---|---|---|---|---|
| 0 | 0 | 1 | 0 | 0 | 0 | 0 |

The feedback current around amplifier 74 through capacitor 76 is $g(t) - g(t_1)$. This current develops a voltage across the capacitor 76 equal to:

$$\frac{1}{RC} \int_{t_1}^{t} (g(t) - g(t_1)) dt.$$

Where R is the value of resistor 70 and C is the capacitance of capacitor 76.

Since the input of amplifier 74 is maintained at ground potential (the + input is grounded), the voltage at output 75 of amplifier 74 will be equal to the voltage across capacitor 76. The waveform 41 in FIG. 3 illustrates the voltage of the amplifier output 75.

At a time $t_2$, the end of the integration period, the switch KC is opened to stop further integration, and the charge on the capacitor 76 remains fixed at that level while certain control functions are effected to prepare for the base line correction. To this end, switches KE and KF are closed to bring in operation another feedback loop 90 including a second feedback amplifier 92 having a memory capacitor 94. Thus following a short interval after time $t_2$, the control signals are in the following states:

| A | B | C | D | E | F | G |
|---|---|---|---|---|---|---|
| 0 | 0 | 0 | 0 | 1 | 1 | 0 |

Amplifier 74 still requires, because of its grounded positive input, a zero input voltage. This requirement drives the junction 96 to a voltage $V_B = -g(t_2) + g(t_1)$. After this voltage has been established switch KE is opened so that the memory capacitor 94 stores the voltage $1,000 (g(t_1) - g(t_2))$, i.e. a voltage representing the difference between the base line level at the start of integration and the base line voltage at the end of integration. This difference voltage thus reflects the amount of base line drift which has occurred during integration.

The next step in preparing for the base line compensation is the discharge of memory capacitor 88 to zeroize the integrator input and compensate for any amplifier offset. For this purpose, switch KD is closed at a time $t_4$, and switch KF is opened and KA is energized. This effectively causes junction 86 to return to zero since all other inputs to amplifier 74 are now equal to zero. The control signals are as follows:

| A | B | C | D | E | F | G |
|---|---|---|---|---|---|---|
| 1 | 0 | 0 | 1 | 0 | 0 | 0 |

Immediately after discharge of memory capacitor 88, the switch KD is opened at a time $t_5$ to disconnect the second feedback path 82 from the integrating amplifier 74. The integrating capacitor 76, however, retains the accumulated integral.

At this time $t_5$ the base line correction is started by applying to the input of the integrator amplifier 74 a voltage derived from memory capacitor 94 and carrying out a further integration for a period of time proportional to the period of original integration. As previously explained, the capacitor 94 stores a voltage representing the difference between base line voltages at times $t_1$ and $t_2$. Graphically, the correction required is to remove the area enclosed by the right-angled triangle indicated at 40 in FIG. 3 from the area originally integrated for the time period $t_1 - t_2$. Hence, after the storage in capacitor 94 of the difference voltage $g(t_1) - g(t_2)$ and the effective discharge of capacitor 88 at time $t_5$, switches KC and KG are closed to connect the stored signal of memory capacitor 94 to the integrating amplifier 74. The charge on the integrating capacitor 76 thereby is augmented (or diminished) at a rate proportional to the amount of base line drift which occurred during integration. The control signals are as follows:

| A | B | C | D | E | F | G |
|---|---|---|---|---|---|---|
| 1 | 0 | 1 | 0 | 0 | 0 | 1 |

The time period of this compensating integration is determined by the time period of the original integration period. However, the compensation time period need not be the same as that of the original integration, providing that a proportional inverse change is made in the level of voltage applied to the input of the integrating amplifier 74 during the selected time period. In the disclosed embodiment, the input voltage level was selected to be equal to 10 times the actual amount of base line voltage drift.

This multiplication factor was introduced by a suitable voltage divider in the output circuit of amplifier 92, specifically by selecting the resistor 98 to be 100 times the size of resistor 100. Thus the voltage at junction 96, with switch KG closed, will be 0.01 times the voltage on memory capacitor 94; since this capacitor voltage 1,000 times the base line drift voltage, the net output voltage will be 10 times the base line drift voltage.

With a voltage multiplication factor of 10, the time period for reintegration must be one-tenth times one-half or one-twentieth of the original period of integration, in order to produce the required amount of correction as discussed above in connection with waveform $g(t)$ in FIG. 3. This reintegration time period is obtained by the ramp generator 28 which at a time $t_6$ issues a pulse to terminate base line correction.

The only input to amplifier 74 during the time period $t_5 - t_6$ is the difference voltage 10 $(g(t_1) - g(t_2))$ at junction 96 on the output of amplifier 92. The base line correction integration proceeds with this voltage for the time period $t_5 - t_6$, as indicated by waveform 41 in FIG. 3. Upon the occurrence of the $t_6$ pulse from the ramp generator 26 the switch KG is opened to stop integration, and the amplifier output 75 at time $t_6$ carries a voltage level corresponding to the integral of peak 14, i.e. the area under that peak, corrected for base line drift. This desired final output may then be indicated in utilization device 20 in any desired fashion.

The utilization device 20 may be actuated at the completion of the base line correction to record the final integrated output from the amplifier 74 at time $t_6$. Such synchronized recordation may be accomplished by coupling the $t_6$ pulse to a strip chart recorder whose pen is momentarily enabled by pulse $t_6$ to record the output 75 of amplifier 74.

FIGS. 4A through 4G illustrate details of the timing pulse generator for generating the control signals A through G. The control signls are initiated in response to pulses from the integration timer 22 (in FIG. 1).

As previously mentioned, prior to base line correction, but after integration, the base line drift is measured and stored and the storage capacitor 88 in FIG. 2 is "cleared," i.e. its charge is removed. The timing signals necessary to accomplish this are generated from pulse forming network 38 in FIG. 1 wherein pulses $t_3$, $t_3'$, $t_4$ and $t_5$ are used with the other timing pulses $t_1$ and $t_2$ to generate the control signals A through G as follows.

Each of FIGS. 4A through 4G is provided with a flip flop. Flip flop 110 includes a set input 112 and a reset input 114. The output 116 provides the desired control signal A for the control of switch KA in FIG. 2. The flip flop 110 is reset by a start pulse $t_0$ which is produced by conventional means (not shown) shortly before timing pulse $t_1$ and is set by timing pulse $t_4$ as shown by the A waveform in FIG. 3.

Figure 4A:
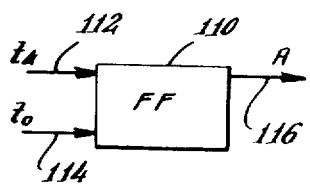
FIGS. 4A through 4G are circuit diagrams showing details of a timing controller used in the embodiment of FIG. 1.
Figure 4B:
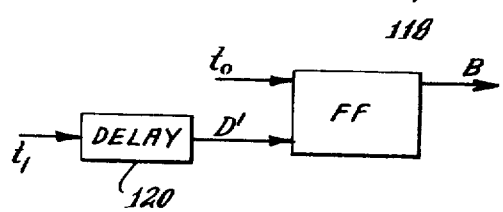

FIG. 4B includes a flip flop 118 which is set by pulse $t_0$ and reset by a pulse D' generated from a delay circuit 120 actuated by timing pulse $t_1$. The output of flip flop 118 is the control signal B having a waveform as shown in FIG. 3. The delay of the resetting of flip flop 118 is desired to avoid undesirable transients as various switches in the integrator are actuated, but the delay period is extremely short so as not to affect the required overall timing.

Figure 4C:
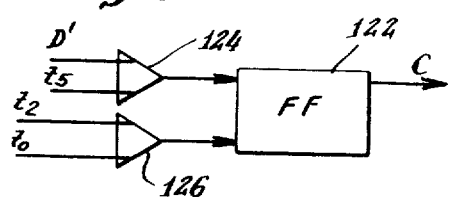

FIG. 4C includes a flip flop 122 set by a pulse from an OR circuit 124 driven by timing pulses D' and $t_5$. The flip flop 122 is reset by a pulse from OR circuit 126 coupled to timing signal $t_2$ and pulse $t_0$. The output of flip flop 122 is the control signal C whose wave-form appears in FIG. 3.

Figure 4D:
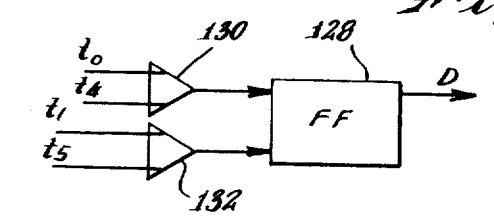

FIG. 4D illustrates a flip flop 128 which is set by an OR circuit 130 coupled to pulses $t_0$ and $t_4$, and rest by a pulse from OR circuit 132 coupled to timing pulses $t_1$ and $t_5$. The output of the flip flop 128 is the control signal D whose waveform appears in FIG. 3.

Figure 4E:
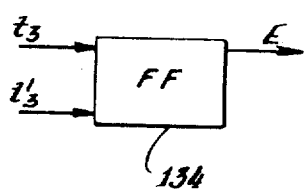
Figure 4F:
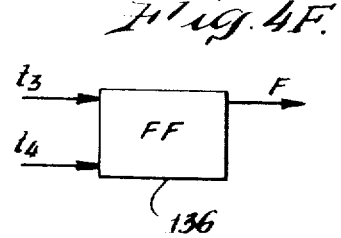
Figure 4G:
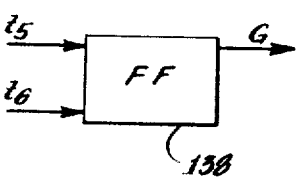

FIG. 4E shows a flip flop 134 set by timing pulse $t_3$ and reset by $t_3'$. The output of the flip flop 134 is the control signal E shown in FIG. 3. In a similar manner the flip flops 136 and 138 provide at their outputs control signals F and G whose waveforms are shown in FIG. 3. The flip flop 136 is set by pulse $t_3$ and reset by pulse $t_4$. The flip flop 138 is set by $t_5$ and reset by $t_6$.

Figure 5:
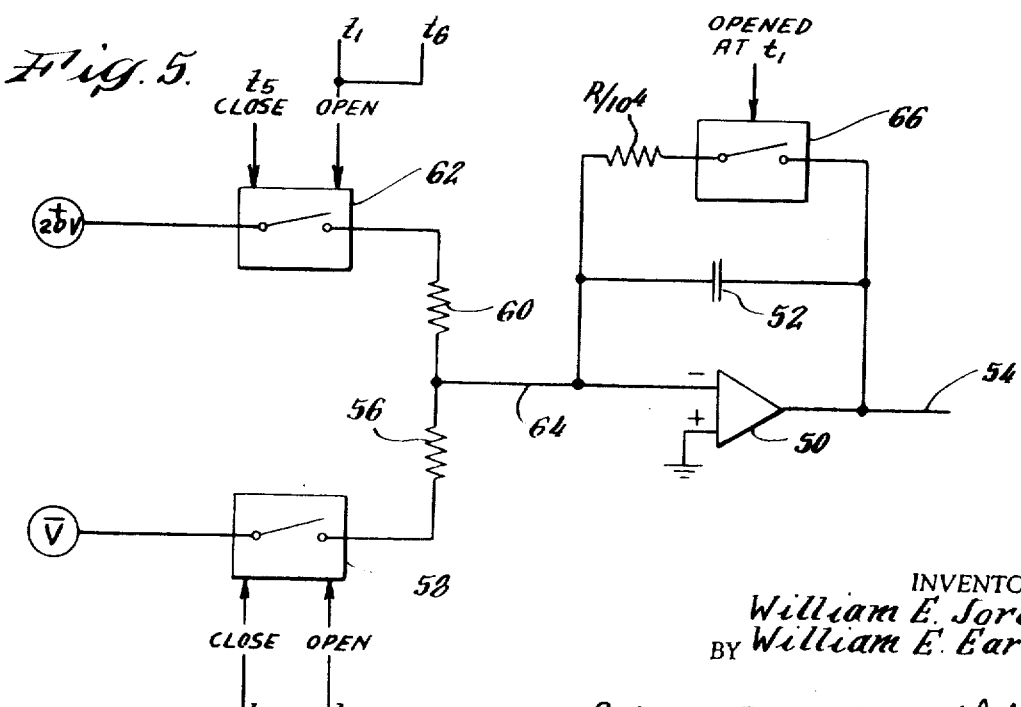
FIG. 5 is a circuit diagram of a ramp generator employed in the apparatus of FIG. 1.

FIG. 5 shows details of a ramp generator 28. This generator includes an operational amplifier 50 including positive and negative inputs and a negative feedback capacitor 52 to provide an integration function at output 54. A resistor 56 connects the negative input to a negative supply voltage of voltage level-V through a switch 58. A second resistor 60 (same value as resistor 56) connects the negative input to a positive supply voltage of voltage level of +20V through a switch 62. The switches 58 and 62 are illustrated as mechanical but of course could be electronic. A switch 66 is connected across the capacitor 52 to discharge the capacitor prior to time $t_1$. The control of the switches is as illustrated by the indicated timing pulses.

Thus at time $t_1$ switch 66 is opened and switch 58 is closed. Closure of switch 58 permits the output 54 to produce a ramp voltage 30 as shown in FIG. 1 until time $t_2$ when switch 58 is opened. At time $t_2$ the voltage across capacitor 52 does not have a discharge path and thus holds its charge at the level 32. At time $t_5$ the switch 62 is closed delivering a large current flow through resistor 60 and input line 64 to the capacitor 52. The capacitor discharges along waveform 34 at a rate 20 times greater than the original charge rate, due to the increased supply voltage level (20V). When the output 54 reaches zero volts again, a pulse ($t_6$) issues from the zero crossing detector 36 (see FIG. 1) signifying the end of the base line correction time period.

Although a specific preferred embodiment of the invention has been described in detail, it should be understood that this is for the purpose primarily of illustrating the invention an should not be considered necessarily as limiting thereof except as required by the prior art.

We claim:

1. Apparatus for integrating a signal having a slowly changing base line comprising:
    an integrator arranged to integrate the signal for a time period;
    means to sense the base line level both at the beginning and at the end of the time period; and
    means coupled to said sensing means to alter the integrated signal in accordance with the difference between said two sensed base line levels and in accordance with said time period of integration.

2. The apparatus as claimed in claim 1, wherein the altering means includes:
    means for storing a voltage proportional to the time period; and
    means controlled by the stored voltage for correctively altering the integrated signal in accordance with a further integration of said difference in base line levels.

3. The apparatus as claimed in claim 2, wherein the storing means further includes:
    a ramp voltage generator and a storage capacitor operatively connected with the ramp generator to store a voltage representative of the ramp voltage;
    first switch means for initiating a first ramp voltage from the generator upon the beginning of the time period and having a duration substantially coincident with the time period, with said capacitor storing a voltage of a value representative of the time period; and
    second switch means for initiating the generation of a second ramp voltage of opposite slope polarity from the first ramp voltage to discharge the capacitor to a level selected to provide a second ramp voltage duration determinative of the duration of the further integration.

4. The apparatus as claimed in claim 3, wherein the ramp generator is formed of an operational amplifier with said capacitor connected in negative feedback relationship with the amplifier;
    third switch means coupled to the capacitor for discharge thereof prior to the beginning of the time period;
    first and second control voltages of selected polarity;
    said first and second switch means being operable respectively to connect the first and second control voltages to an input of the amplifier.

5. An apparatus for integrating a time limited electrical input signal having a variable base line, comprising:
    an integrator arranged to integrate the input signal;
    means for controlling the integrator to limit the time period of integration of the input signal;
    means for sensing the base line drift of the input signal both at the beginning and at the end of said time period and to produce a drift signal representing the net drift of the base line during said time period; and
    means responsive to said drift signal for correcting the magnitude of the integrated input signal in correspondence with the sensed base line drift represented by said drift signal.

6. The apparatus as claimed in claim 5, wherein the integrator includes:
    means for storing a first voltage representative of the base line level at the beginning of the time period;
    means for applying the first stored voltage to the integrator together with said input signal to integrate the difference therebetween;
    means for storing a second voltage representative of the base line drift at the end of integration; and
    means operable after said time period for applying the second stored voltage to the input of said integrator to carry out further integration and alter the output of the integrator to correct for base line drift.

7. An apparatus for integrating a time limited electrical input signal having a variable base line comprising:
    means producing timing signals representative both of the beginning and of the end of the input signal;
    means actuated by the timing signals for integrating the input signal;
    means actuated by the timing signals for generating a base line correction signal representative of a time period proportional to the time duration of the integration of said input signal;
    means for sensing the net base line drift of the input signal during the integration thereof; and
    means for altering the integrated input signal in correspondence with the product of the net base line drift and said time period as represented by the base line correction signal to obtain an accurate integration of the time limited input signal.

8. An apparatus for integrating a time limited electrical input signal having a variable base line comprising:
   a first operational amplifier having a first negative feedback capacitor associated therewith and first switch means for selectively connecting the first capacitor with the first amplifier;
   a second operational amplifier and second capacitor in negative feedback relationship therewith and second switch means for selectively connecting the second amplifier in feedback relationship with the first amplifier;
   a third operational amplifier and a third capacitor in negative feedback relationship therewith and third switch means for selectively interconnecting the third amplifier in feedback relationship with the first amplifier;
   mans for controlling the first and second switch means to effect a storage of the base line level at the beginning of the input signal in the second capacitor;
   means for controlling said first and second switch means to integrate the difference between the input signal and the stored base line signal and store the integrated signal in the first capacitor;
   means for controlling the first, second and third switch means to effect a storage in the third capacitor of a signal representative of the difference in base line levels at the beginning and end of the input signal; and
   means for controlling the first and third switch means to effect an integration of the stored signal in the third capacitor for a time period related to the duration of the input signal and combine the integrated signal in the first capacitor with the integrated difference signal to form a base line corrected output signal from the first amplifier accurately representative of the integrated input signal.

9. A method of integrating a time limited input signal having a drifting base line comprising the steps of:
   integrating the input signal for a certain time period;
   developing a signal representing the difference in base line level at the beginning and at the end of that certain time period of integration; and
   correcting the results of the integration in accordance with said difference signal and the time period of integration.

10. The method of claim 9, wherein the correction comprises carrying out subsequent integration of the difference signal for a second time period proportional to the original time period, and combining the results of the two integrations.

11. The method of claim 10, including the step of producing a ramp signal in a predetermined direction during the original integration to develop a time signal proportional to the integration period, using said time signal to produce a second ramp signal in the opposite direction during the second integration, and stopping the second integration when the ramp signal reaches its original value.

12. The method of integrating a time-limited signal having a drifting base line, comprising the steps of:
   integrating the signal for a limited time period to produce a first output;
   sensing the base line level at the beginning and end of said time period; and
   alternating said first output by an amount proportional to the product of said time period and the difference between said beginning and end base line levels.

13. The method of claim 12, wherein said altering step comprises carrying out a corrective integration of said base line difference for a second time period proportional to said first time period and combining the results of said corrective integration with the results of the integration of said signal.

14. Apparatus for integrating a time-limited signal the base line of which may drift during the integration period, comprising:
   integrator means adapted to receive the signal as an input and to produce an output responsive to the time integral thereof;
   control means for activating said integrator for a time period during which said signal is to be integrated;
   means for sensing the base line level of said signal at the beginning and end of said time period; and
   correction means coupled to said sensing means and operable subsequent to said time period to alter said integrator output by an amount responsive to the difference between the base line levels sensed at the beginning and end of said time period.

15. Apparatus as claimed in claim 14, wherein said correction means comprises means to activate said integrator for a second time period proportional to said first time period; said correction means further including means to apply to the input of the integrator during said second time period a signal proportional to the difference in base line levels at the beginning and end of said first time period.

* * * * *

UNITED STATES PATENT OFFICE
CERTIFICATE OF CORRECTION

Patent No. 3,660,769  Dated May 2, 1972

Inventor(s) William E. Jordan, et al

It is certified that error appears in the above-identified patent and that said Letters Patent are hereby corrected as shown below:

On the cover sheet [54] in the title, "DRAFT" should read -- DRIFT --. Column 4, line 36, after "voltage" insert -- was --. Column 5, line 22, "rest" should read -- reset --.

Signed and sealed this 7th day of November 1972.

(SEAL)
Attest:

EDWARD M. FLETCHER, JR.
Attesting Officer

ROBERT GOTTSCHALK
Commissioner of Patents